United States Patent [19]

König-Lumer et al.

[11] 4,358,389
[45] Nov. 9, 1982

[54] AGENT FOR DE-ICING AND PROTECTING AGAINST ICING-UP

[75] Inventors: Inge König-Lumer, Mühldorf; Ulrich Schwenk, Burghausen; René Salvador, Altötting; Josef Kapfinger, Burgkirchen, all of Fed. Rep. of Germany

[73] Assignee: Hoechst Aktiengesellschaft, Fed. Rep. of Germany

[21] Appl. No.: 244,976

[22] Filed: Mar. 18, 1981

[30] Foreign Application Priority Data

Oct. 25, 1980 [DE] Fed. Rep. of Germany ....... 3040376

[51] Int. Cl.³ .............................................. C09K 3/18
[52] U.S. Cl. ......................................... 252/70; 106/13
[58] Field of Search ............................ 252/70; 106/13

[56] References Cited
U.S. PATENT DOCUMENTS

| 2,373,727 | 4/1945 | West | 106/13 |
| 3,412,030 | 11/1968 | Wahlberg | 252/70 |
| 3,624,243 | 11/1971 | Scott | 252/70 |
| 3,630,913 | 12/1971 | Scott | 252/70 |
| 3,940,356 | 2/1976 | Byrnes | 252/70 X |

FOREIGN PATENT DOCUMENTS

| 772557 | 11/1967 | Canada | 252/70 |
| 2423893 | 11/1975 | Fed. Rep. of Germany | 252/70 |
| 1285862 | 8/1972 | United Kingdom | 252/70 |

*Primary Examiner*—Dennis L. Albrecht
*Attorney, Agent, or Firm*—Connolly and Hutz

[57] ABSTRACT

A liquid agent for de-icing and protecting against icing-up is described, by means of which it is possible, in particular, to free the metal surface of aircraft rapidly and completely from ice, hoar-frost, snow and the like, and to protect the surface against further build-up for a relatively long period. The agent is essentially composed of several components, namely of (a) glycols, (b) water, (c) thickeners, (d) substances insoluble in water, (e) surface-active agents, (f) corrosion inhibitors and (g) alkaline compounds, in very specific quantities in each case, the quantity of the components (a) and (b) being at least 94%, relative to the total weight of the agent. Its pH value is 7.5 to 10.

10 Claims, No Drawings

AGENT FOR DE-ICING AND PROTECTING AGAINST ICING-UP

The invention relates to a liquid agent for de-icing and protecting against icing-up, in order, in particular, to free aircraft surfaces from ice, hoar-frost and/or snow and to protect them against further build-up.

In the cold seasons of the year, deposits (layers) of ice, hoar-frost and/or more or less adhesive snow, are formed, particularly at a relatively high atmospheric humidity or during rain and/or snowfall. The main disadvantage of such deposits on aircraft is that certain parts of the aircraft can be prevented from functioning and the normal aerodynamic conditions are altered.

It has, therefore, already been known for a long time to use de-icing fluids based on customary anti-freeze agents, preferably glycols and glycerol, to free aircraft surfaces from ice and, if appropriate, hoar-frost or snow, and also to effect the prevention, for as long a period as possible, of further formation of ice, snow or hoar-frost.

The present requirements for a good agent for de-icing and protecting against icing-up cover a very large number of aspects. Amongst the most important of these, the following may be mentioned particularly: easy applicability by means of conventional spraying devices to the surfaces to be freed and protected; no appreciable corrosive action, particularly towards metals, such as aluminum, non-ferrous metals and steel, and towards glass and acrylic sheeting; rapid and complete thawing of ice, snow and hoar-frost; formation of a coherent liquid film after application to the appropriate surfaces, even if the latter are not horizontal; high stability against shear; optimum viscosity; and long-lasting protective action against further formation of ice, hoar-frost and/or snow, that is to say the liquid agent applied should have a long-lasting protective action (this is expressed by the holdover time, as it is called).

The known agents for de-icing and protecting against icing-up only fulfil these requirements in part. Particularly in regard to stability against shear, optimum viscosity, optimum rheological behavior and holdover time, they leave something to be desired. A high stability against shear and optimum rheological behavior are important because they are the precondition for handling and spraying the de-icing fluid without problems. This is because both factors ensure the maintenance of the required viscosity, even in the case of treatments such as stirring at high speeds of revolution, pumping and the like, ensure laminar flow for the fluid even at a high shear rate, and exclude the occurrence of turbulence, which is absolutely necessary, both for spraying the liquid on and for it to flow off in a problem-free manner, particularly from aircraft wing surfaces during take-off.

The viscosity of a good agent for de-icing and protecting against icing-up is optimal if it is about 100 to 1,000 mm$^2$/s, preferably about 200 to 800 mm$^2$/s, at 20° C. and is about 1,000 to 4,000 mm$^2$/s, preferably about 1,500 to 3,000 mm$^2$/s, at −10° C.

Only a relatively long holdover time ensures that there is no appreciable further build-up, or none at all, on the metal surface of ice, snow and/or hoar-frost.

U.S. Pat. No. 2,373,727 of 1945 describes an agent for preventing the formation and accumulation of ice on aircraft surfaces, which consists essentially of glycols as the anti-freeze agent and the main constituent, if appropriate together with water; gelatine, glue, soaps or natural rubber as a thickener for controlling the viscosity; a water-insoluble compound belonging to the group comprising mineral oils, animal oils, vegetable oils, synthetic oils and water-insoluble alcohols; and any desired nonionic or ionic surface-active agent as a dispersing agent for the oils. Amongst other compounds, low-molecular aliphatic alcohols, salts of sulfonic acids and petroleum sulfonates are also mentioned as surface-active agents.

The de-icing fluid for aircraft surfaces disclosed in German Auslegeschrift No. 1,901,061 is composed essentially of polyalcohols, glycols and water as the main constituent; a homopolymer or copolymer of an unsaturated carboxylic acid as a thickener; a special polyethylene glycol or polyethylene/polypropylene glycol as a nonionic surface-active agent; and an alkaline compound to neutralize the polymer. It is emphasized several times that the thickener must not have a viscosity of more than 5,000 mm$^2$/s, determined in a 1% strength aqueous solution at pH 7.5 to 9.0 and at 20° C.

In developing further the mixtures disclosed in U.S. Pat. No. 2,373,727 and German Auslegeschrift No. 1,901,061, attempts have been made to employ better thickeners and more advantageous surface-active agents. Thus German Auslegeschrift No. 2,423,893 attempts to improve the mixture disclosed in German Auslegeschrift No. 1,901,061 by employing, as nonionic surface-active agents, polyoxethylates of alcohols, fatty acids, fatty acid amines and fatty acid amides, and water-insoluble compounds belonging to the group comprising fatty alcohols, alkylphenols, alkylbenzenes, fatty acid esters and fatty acid alkanolamides. The thickeners used are the homopolymers and copolymers of unsaturated carboxylic acids described in German Auslegeschrift No. 1,901,061, and it is emphasized that their viscosity in a 1% strength aqueous solution at pH 7.5 to 9.0 and 20° C. must not be more than 5,000 mm$^2$/s.

Besides the nonionic surface-active agents which are described as essential in German Auslegeschrift No. 2,423,893, several other ionic surface-active agents are also mentioned, amongst them olefinsulfonates and alkylbenzenesulfonates, too. However, it is evident that, just as in the U.S. Pat. No. 2,373,727 mentioned, no very great importance is to be attached to the nature (structure) and quantity to be employed of these ionic surface-active agents. German Auslegeschrift No. 2,423,893 also advises against the use of mineral oils in formulating de-icing agents for aircraft surfaces.

Finally, a liquid de-icing agent for non-horizontal surfaces is disclosed in U.S. Pat. No. 3,940,356. It consists essentially of glycols and water as the main constituent; of a thickener belonging to the group comprising crosslinked polyacrylates; of at least one low-molecular aliphatic alcohol; and of an alkaline compound in a quantity such that the mixture is neutral. This de-icing agent is evidently particularly suitable for de-icing automobile windscreens.

As already stated above, the known de-icing fluids leave something to be desired in respect of certain important properties.

The object of the invention is, therefore, to find an agent for de-icing and protecting against icing-up, particularly for aircraft, which fulfils the demands mentioned initially, and particularly those relating to the important properties, namely stability against shear, viscosity, rheological behavior (this is, in particular, the viscosity and flow behavior at a low and at a very high shear rate) and holdover time. It should also be non-corrosive, above all towards the materials mentioned above.

The agent, according to the invention, for de-icing and protecting against icing-up consists essentially of (a) 40 to 65% by weight of a glycol belonging to the group comprising alkylene glycols having 2 to 3 carbon atoms and oxalkylene glycols having 4 to 6 carbon atoms; (b) 35 to 60% by weight of water; (c) 0,05 to 1.5% by weight of a thickener belonging to the group comprising crosslinked polyacrylates having a viscosity of 1,000 to 50,000 mPa.s in a 0.5% strength by weight aqueous solution at 20° C. and a pH value of 7.5 to 10, and having a laminar flow behavior in a 0.1 to 1.5% strength by weight aqueous solution at +20° C., 0° C. and −10° C. and a pH value of 7.5 to 10, at a shear rate of up to at least 20,000 seconds$^{-1}$; (d) 0.05 to 1% by weight of a water-insoluble component belonging to the group comprising mixed-base mineral oils; (e) 0.05 to 1% by weight of a surface-active agent belonging to the group comprising alkali metal alkylarylsulfonates; (f) 0.01 to 1% by weight of at least one corrosion inhibitor; and (g) a quantity of at least one alkaline compound belonging to the group comprising alkali metal carbonates, bicarbonates or hydroxides and amines, such that the agent has a pH value of 7.5 to 10, the quantity of the components (a) and (b) in the agent being at least 94% by weight, relative to the weight of the agent.

The component (a) of the agent, according to the invention, for de-icing and protecting against icing-up is preferably ethylene glycol, propylene glycol (1,2-propylene glycol or 1,3-propylene glycol) and/or diethylene glycol. Its quantity is preferably 45 to 60% by weight, relative to the weight of the agent (weight of the fluid or the mixture, that is to say the total mixture).

The quantity of the component (b) is preferably 40 to 55% by weight, relative to the weight of the agent. The water is preferably demineralized water (obtained by treatment with ion exchangers or by distillation).

The component (c) consists of crosslinked polyacrylates having a specific viscosity and a special flow behavior. The polyacrylates to be used in accordance with the invention and their preparation are described in detail in U.S. Pat. No. 2,923,692, which is hereby intended to form a part of this description.

In principle, any of the crosslinked polymers mentioned in U.S. Pat. No. 2,923,692 can be employed, provided they have the viscosity and flow properties prescribed in accordance with the invention. Within the scope of the present invention, the term polyacrylates preferably includes homopolymers and copolymers of acrylic acid or methacrylic acid. The proportion of comonomer in the copolymer can, in general, be 2 to 50% by weight, preferably 5 to 30% by weight, relative to the copolymer. Amongst the homopolymers and copolymers of acrylic acid or methacrylic acid, the homopolymers are preferred. The homopolymers of acrylic acid are particularly preferred.

Amongst the crosslinking agents described in U.S. Pat. No. 2,923,692, it is preferable to use divinylbenzene, dienes, such as butadiene, or polyalkenyl polyethers of polyhydroxyalcohols having more than one, preferably two or more, CH$_2$=C< groups per molecule, because they produce particularly highly crosslinked polymers, Examples of advantageous compounds belonging to the group comprising polyalkenyl polyethers of polyhydroxyalcohols are di-, tri-, tetra- and penta-allyl ethers of erythritol, xylitol, fructose, sucrose and raffinose, crotonyl polyethers of glucose, raffinose and the like, and also mixed allyl and crotonyl polyethers of the said polyalcohols (compare U.S. Pat. No. 2,923,692).

The viscosity of the crosslinked polyacrylates to be used in the present invention is appropriately determined in a 0.5% strength by weight aqueous solution at 20° C. and pH 7.5 to 10, preferably 8 to 9.5.

The viscosity should preferably be 5,000 to 30,000 mPa.s, in particular 10,000 to 20,000 mPa.s.

A further decisive criterion for the polyacrylates to be used in accordance with the invention is their flow behavior at high shear rates. High shear rates occur at velocity gradients from about 500 seconds$^{-1}$; they generally include the range from 1,000 to 15,000 seconds$^{-1}$. The crosslinked polyacrylates to be used in accordance with the invention should also have laminar flow at high shear rates of this type. Laminar flow behavior is appropriately checked by starting from a 0.1 to 1.5% strength by weight aqueous solution of the polyacrylate at +20° C., 0° C. and −10° C. and a pH value of 7.5 to 10, preferably 8 to 9.5, and determining the viscosity curve of the solutions by means of a high shear rotary viscometer, the shear rate being taken from 0 seconds$^{-1}$ up to a region of high shear rates. It can be seen from the resulting flow curve whether laminar or non-laminar flow exists.

The quantity of component (c) is preferably 0.1 to 1% by weight, relative to the weight of the agent.

The component (d) of the agent, according to the invention, for de-icing and protecting against icing-up is a mixed-base mineral oil. It is preferably essentially composed of 60 to 70% by weight of paraffin hydrocarbons and 30 to 40% by weight of naphthenes (cycloparaffins). The number of carbon atoms in the paraffin hydrocarbons is preferably 12 to 18 (this means an average number of about 15). The number of C atoms in the naphthenes is preferably 10 to 20 (this means an average number of about 15). The mineral oils to be employed in accordance with the invention are described, for example, in Kirk-Othmer, Encyclopedia of Chemical Technology, Second Edition, Volume 15, pages 8 to 10, publisher: John Wiley and Sons Inc., New York, (wherein mixed-base mineral oils are referred to as "intermediate-base oils") and in Ullmanns Enzyklopädie der technischen Chemie (Ullmann's Encyclopedia of Industrial Chemistry), 4th Edition, Volume 10 (published in 1975), pages 624 and 625, Verlag Chemie, Weinheim, Federal Republic of Germany.

The quantity of the component (d) is preferably 0.1 to 0.5% by weight, relative to the weight of the agent.

The component (e) of the agent, according to the invention, for de-icing and protecting against icing-up is preferably a potassium and/or sodium alkylarylsulfonate containing one or more, preferably one or two, sulfonate groups (SO$_3$K or SO$_3$Na groups), one or more, preferably one or two, alkyl groups having 5 to 18, preferably 12 to 18, C atoms and one or more, preferably one or two, benzene rings. Potassium and/or sodium alkylbenzenesulfonates having 12 to 18 C atoms in the alkyl group are preferred (they contain one SO$_3$K or SO$_3$Na group and one alkyl group). Since the starting materials used in the manufature of alkylarylsulfonates are also mixtures of hydrocarbons such as are produced, for example, as fractions in processing petroleum, the alkyl group can also represent mixtures of this type. The number of carbon atoms therein is preferably 12 to 18 (this means an average number of 15).

The alkylarylsulfonates to be used as the component (e) has been known for a long time. Their preparation and their properties are described, for example, in the textbook on "Surface Active Agents and Detergents", Volume II, 1958, pages 78 to 87 and 93 to 97, by Anthony M. Schwartz, James W. Perry and Julian Berch, Interscience Publishers, Inc., New York and London.

The quantity of the component (e) is preferably 0.1 to 0.7% by weight, relative to the weight of the agent.

The component (f) consists of corrosion inhibitors. Examples of suitable corrosion inhibitors are those belonging to the group comprising inorganic alkali metal salts, preferably the potassium or sodium salts of carbonic acid, of phosphorous acid, of phosphoric acid and of silicic acid; alkali metal salts of fatty acids, preferably the potassium or sodium salt of lauric acid, palmitic acid, stearic acid, benzoic acid and oleic acid; monoalkylamines and dialkylamines—optionally alkoxylated- —and salts thereof with a mineral acid or a fatty acid, preferably butylamine, hexylamine, octylamine, isononylamine, oleylamine, di-propylamine and dibutylamine; alkanolamines—optionally alkoxylated- —and salts thereof with a fatty acid, preferably mono-, di- and tri-ethanolamines, mono-, di- and tri-propanolamines and mono-, di- and tri-isopropanolamines; esters of phosphorous acid or of phosphoric acid with aliphatic alcohols having 1 to 6 C atoms, preferably ethyl phosphate, dimethyl phosphate, isopropyl phosphate, diisopropyl phosphate, butyl phosphite and dimethyl phosphite; and triazoles; preferably benztriazole and tolyltriazole.

Corrosion inhibitors which are employed preferentially are those belonging to the group comprising potassium and sodium salts of carbonic acid, phosphorous acid, phosphoric acid and silicic acid, mono-, di- and tri-ethanolamines, mono-, di- and tri-propanolamines, mono-, di- and tri-isopropanolamines and benztriazole. Amongst these, potassium silicate or sodium silicate, triethanolamine and/or benztriazole are preferred.

The quantity of the component (f) is preferably 0.05 to 0.5% by weight, relative to the weight of the agent.

The component (g) in the agent, according to the invention, for de-icing and protecting against icing-up is preferably potassium hydroxide, in a quantity such that the agent has a pH value of, preferably, 8 to 9.5. The quantity of the component (g) is generally 0.05 to 1.5% by weight, preferably 0.1 to 0.5% by weight, relative to the weight of the agent.

The quantity of the components (a) and (b) in the agent according to the invention is preferably 96 to 99% by weight, relative to the weight of the agent.

In addition to the components (a) to (g), the agent, according to the invention, for de-icing and protecting against icing-up can also contain appropriate additives, preferably anti-oxidants and polysaccharides (gums) in effective quantities (gums are additional thickeners).

Suitable anti-oxidants are preferably compounds having a phenolic character, such as dimethylcresol and butylhydroxyanisole.

It has been found that polysaccharides have an advantageous effect on the rheological properties of crosslinked polyacrylates, particularly those having viscosity values in the lower range of the viscosity limits indicated above, that is within the range from about 1,000 to 5,000 mPa.s. Preferred polysaccharides are those of the type of high-molecular xanthan gum. The molecular weight is as a rule greater than 1 million, and is preferably 2 to 15 million.

The quantity of anti-oxidants is generally 0.01 to 0.5% by weight, preferably 0.03 to 0.1% by weight, relative to the weight of the agent. The quantity of polysaccharides is generally 0.01 to 0.5% by weight, preferably 0.03 to 0.1% by weight, relative to the weight of the agent.

The preparation of the agent, according to the invention, for de-icing and protecting against icing-up is effected, in principle, by mixing the individual components together in any desired sequence. This can be carried out, for example, in a vessel equipped with a stirrer, if appropriate while warming to about 100° C.

In an advantageous method of preparation, which makes it possible to achieve relatively rapid solution of the individual components, the procedure adopted is as follows: the water (component b) is initially placed in a vessel and the polyacrylate (component c) is added, while stirring (room temperature). After the addition, it is appropriate to continue stirring for some time, for example for 30 minutes to 3 hours. The mixed-base mineral oil (component d) is then added, while stirring, the alkylarylsulfonate (component e) and the corrosion inhibitor (component f) are mixed in and the glycol (component a) is then introduced. The alkaline compound (component g) is now appropriately added in the form of, for example, a 10% strength aqueous solution, so that the pH is adjusted to a value of 7.5 to 10, preferably 8 to 9.5.

The agent, according to the invention, for de-icing and protecting against icing-up exhibits surprisingly good properties, above all an unexpectedly long hold-over time. It is also distinguished, in particular, by an optimal viscosity, optimal rheological properties and a sufficiently high stability against shear. It also has a relatively high depression of the freezing point, a good wetting action, only a slight hydrophilic character, high stability to heat, a capacity for being stored for very long periods, even at high temperatures, and an excellent anti-corrosion character. When applied to aircraft, it is also distinguished by its surprisingly good ease of spraying and its very advantageous run-off properties after the machine has taken off.

In using the agent, according to the invention, for de-icing and protecting against icing-up it is appropriate to dilute the latter further with water, preferably in the ratio of 80:20 or 50:50. In this diluted form, it is sprayed by means of the conventional equipment onto the surfaces to be treated. In de-icing aircraft, the dilute solution is generally warmed to 50° to 80° C. before being sprayed on. It is appropriate to employ the product undiluted for protecting areas which have been de-iced.

The invention will now be illustrated in greater detail by means of examples:

EXAMPLE 1

An agent, according to the invention, for de-icing and protecting against icing-up is prepared from the following components (in % by weight):
45.00 diethylene glycol
10.00 propylene glycol
43.80 water
0.27 crosslinked polyacrylic acid; the viscosity of the polymer in a 0.5% strength aqueous solution at 20° C. and pH 9 is 16,000 mPa.s,
0.23 mixed-based mineral oil, composed essentially of about 65% by weight of paraffin hydrocarbons in which the average number of carbon atoms is 15, and about 35% by weight of naphthenes in which the average number of carbon atoms is 15,
0.40 sodium alkylbenzenesulfonate in which the average number of carbon atoms in the alkyl group is 15,
0.07 corrosion inhibitor and
0.23 85% strength potassium hydroxide.

16 l of completely demineralized water are initially placed in a vessel and 108 g of the polyacrylic acid are added while stirring. After the addition, stirring is continued for 2½ hours. 18 kg of diethylene glycol, 4 kg of propylene glycol, 92 g of the mixed-based mineral oil, 160 g of the alkylbenzenesulfonate and 16 g of corrosion inhibitor and then mixed in. 95 g of 85% strength KOH are now dissolved in 1,520 g of completely demineralized water; this solution is stirred into the mixture. The resulting agent for de-icing and protecting against icing-up has a pH value of 9.2.

Properties:
1. The holdover time is 9 hours.
2. The flow behavior in a rotary viscometer at a shear rate within the range from 0 seconds$^{-1}$ to 40,000 seconds$^{-1}$ is laminar.

|  | 3. Ubbelohde viscosity | | |
|---|---|---|---|
|  | +20° C. | 0° C. (mm$^2$/second) | −10° C. |
| Concentrate | 320 | 1,000 | 2,000 |
| Product diluted 80:20 with water | 530 | 1,300 | 2,500 |
| Product diluted 50:50 with water | 210 | 400 | 650 |

EXAMPLE 2

An agent, according to the invention, for de-icing and protecting against icing-up is prepared from the following components (in % by weight):
48.00 propylene glycol
50.60 water
0.30 crosslinked polyacrylic acid; the viscosity of the polymer in a 0.5% strength aqueous solution at 20° C. and pH 9 is 14,000 mPa.s,
0.26 mixed-base mineral oil, composed essentially of about 70% by weight of paraffin hydrocarbons in which the average number of carbon atoms is 15, and about 30% by weight of naphthenes in which the average number of carbon atoms is 15,
0.50 sodium alkylbenzenesulfonate in which the average number of carbon atoms in the alkyl group is 15,
0.07 corrosion inhibitor and
0.27 85% strength potassium hydroxide.

1,518 g of completely demineralized water are initially placed in a vessel. 8.1 g of 85% strength KOH, 15 g of the alkylbenzenesulfonate, 8.7 g of the mixed-base mineral oil, 1.5 g of corrosion inhibitor and 700 g of propylene glycol are added, while stirring. The mixture is then heated to 50° to 60° C. and 9 g of the polyacrylic acid and a further 740 g of propylene glycol are stirred in. The mixture is then stirred for about a further 6 hours at the temperature mentioned. The resulting agent for de-icing and protecting against icing-up has a pH value of 9.0.

Properties:
1. The holdover time is 5 hours.
2. The flow behavior in a rotary viscometer at a shear rate within the range from 0 seconds$^{-1}$ to 40,000 seconds$^{-1}$ is laminar.

|  | 3. Ubbelohde viscosity | | |
|---|---|---|---|
|  | +20° C. | 0° C. (mm$^2$/second) | −10° C. |
| Concentrate | 320 | 950 | 1,900 |
| Product diluted 80:20 with water | 450 | 1,050 | 2,200 |
| Product diluted 50:50 with water | 180 | 380 | 600 |

EXAMPLE 3

An agent, according to the invention, for de-icing and protecting against icing-up is prepared from the following components (in % by weight):
45.00 diethylene glycol
10.00 propylene glycol
42.65 water
0.70 crosslinked polyacrylic acid; the viscosity of the polymer in a 0.5% strength aqueous solution at 20° C. and pH 9 is 3,000 mPa.s,
0.15 mixed-based mineral oil according to Example 1
0.25 sodium alkylbenzenesulfonate according to Example 1
0.90 corrosion inhibitor
0.30 85% strength potassium hydroxide and
0.05 anti-oxidant.

The components are mixed in a vessel equipped with a stirrer (it being possible to add the components in any desired sequence). The resulting agent for de-icing and protecting against icing-up has a pH value of 9.5.

Properties:
1. The holdover time is 7 hours.
2. The flow behavior corresponds to that in Example 1.

|  | 3. Ubbelohde viscosity | | |
|---|---|---|---|
|  | +20° C. | 0° C. (mm$^2$/second) | −10° C. |
| Concentrate | 380 | 970 | 1,800 |
| Product diluted 80:20 with water | 200 | 400 | 660 |
| Product diluted 50:50 with water | 50 | 100 | 150 |

EXAMPLE 4

The procedure followed is as in Example 3, the following components being employed (in % by weight):
48.00 propylene glycol
50.51 water
0.70 crosslinked acrylic acid copolymer having a viscosity, in a 0.5% strength aqueous solution at 20° C. and pH 9, of 5,000 mPa.s,
0.15 mixed-base mineral oil according to Example 1
0.25 sodium alkylbenzenesulfonate according to Example 1
0.04 corrosion inhibitor
0.30 85% strength potassium hydroxide and
0.05 anti-oxidant.

Properties of the agent:
1. The holdover time is 7 hours.
2. The flow behavior corresponds to that in Example 1.

|  | 3. Ubbelohde viscosity | | |
|---|---|---|---|
|  | +20° C. | 0° C. (mm²/second) | −10° C. |
| Concentrate | 350 | 1,000 | 1,850 |
| Product diluted 80:20 with water | 200 | 390 | 670 |
| Product diluted 50:50 with water | 50 | 90 | 160 |

EXAMPLE 5

The procedure followed is as in Example 3, the following components being employed (in % by weight):
45.00 diethylene glycol
10.00 propylene glycol
42.81 water
0.83 crossliked acrylic acid copolymer having a viscosity, in a 0.5% strength aqueous solution at 20° C. and pH 9, of 1,500 mPa.s,
0.15 mixed-base mineral oil according to Example 1
0.25 sodium alkylbenzenesulfonate according to Example 1
0.62 corrosion inhibitor
0.24 85% strength potassium hydroxide
0.05 anti-oxidant and
0.05 xanthan gum.

Properties of the mixture:
1. The holdover time is 6 hours.
2. The flow behavior corresponds to that of Example 1.

|  | 3. Ubbelohde viscosity | | |
|---|---|---|---|
|  | +20° C. | 0° C. (mm²/second) | −10° C. |
| Concentrate | 360 | 1,000 | 1,800 |
| Product diluted 80:20 with water | 180 | 450 | 650 |
| Product diluted 50:50 with water | 60 | 90 | 160 |

After this agent has aged by being allowed to stand for 4 weeks at 95° C. in a closed vessel, the viscosity exhibits the values shown below:

|  | Ubbelohde viscosity | | |
|---|---|---|---|
|  | +20° C. | 0° C. (mm²/second) | −10° C. |
| Concentrate | 500 | 1,300 | 2,300 |
| Product diluted 80:20 with water | 300 | 750 | 1,600 |
| Product diluted 50:50 with water | 90 | 160 | 500 |

The holdover time of the aged mixture is 8 hours.
Determination of the holdover time:

The holdover time (time during which ice is prevented from forming) is determined with the aid of the device described below and the method described below: the measuring device comprises a sheet 10 mm thick, made of the alloy AlCuMg, which is polished to a high state of gloss and is inclined at an angle of 10° to the horizontal and is subdivided into four drain-off tracks, separated from one another. A box-shaped container, through which cooling brine flows, is located below the sheet, so that the temperature of the sheet is kept at −10° C. The temperature of the four drain-off tracks can be determined accurately by means of resistance thermometers. Another decisive factor for reproducible measurements is a defined ambient climate. The whole apparatus is therefore placed in an air-conditioned room which has a temperature of 20±1° C. and a relative atmospheric humidity of 60%±2%. Possible turbulence of the air above the test surface (the upper surface of the sheet) is excluded by means of housing made of transparent plastic sheeting which is ventilated in a draft-free manner.

As soon as the device is ready, that is to say the sheet has been cooled to −10° C. and has been rubbed dry, 50 ml of test fluid are poured on each of the drain-off tracks. The pouring is effected in such a way that about 5% of the total area of the drain-off track in the upper part of the drain-off track is not covered with test fluid and an approximately straight and horizontal boundary line is formed at the point where pouring takes place. As a rule, depending on the viscosity, 50 ml of test fluid are poured on in the course of about 5 minutes. As a rule, again depending on the viscosity of the test fluid, a drain-off track is completely covered with test fluid in the course of 5 to 30 minutes.

The holdover time is the time which elapses until the formation of ice is observed on a drain-off track surface which has been covered with test fluid.

The viscosity of the agent according to the invention is determined in an Ubbelohde viscometer as specified in DIN 51,562 (depending on the viscosity, the viscometer used has a capillary constant of 1 and capillary internal diameter of 2.01 mm, or constant 3 and diameter 2.65 mm or constant 5 and diameter 3.00 mm).

The viscosity of the polyacrylates (component c) is determined in a Brookfield rotary viscometer at 20 revolutions per minute. Depending on the viscosity of the solution to be tested, spindles nos. 4, 5 or 6 are employed.

The flow behavior (stability to shear) of the agent according to the invention and of the polyacrylates is determined in a high shear rotary viscometer which permits shear rates of up to 40,000 seconds$^{-1}$ (DIN 53,018 and DIN 53,019). In this determination, the so-called flow curve is recorded, starting at 0 seconds$^{-1}$ and going up to a velocity gradient of about 40,000 seconds$^{-1}$.

We claim:
1. Agent for de-icing and protecting against icing-up, consisting essentially of (a) 40 to 65% by weight of a glycol selected from the group consisting of alkylene glycols having 2 to 3 carbon atoms and oxalkylene glycols having 4 to 6 carbon atoms; (b) 35 to 60% by weight of water; (c) 0.05 to 1.5% by weight of a thickener comprising cross-linked polyacrylates having a viscosity of 1,000 to 50,000 mPa.s in a 0.5% strength by weight aqueous solution at 20° C. and a pH value of 7.5 to 10, and having a laminar flow behavior in a 0.1 to 1.5% strength by weight aqueous solution at +20° C., 0° C. and −10° C. and a pH value of 7.5 tp 10, at a shear rate of up to at least 20,000 seconds$^{-1}$; (d) 0.05 to 1% by weight of a water-insoluble component comprising a mixed-base mineral oil comprising paraffin hydrocarbons and naphthenes; (e) 0.05 to 1% by weight of a surface-active agent comprising alkali metal alkylarylsulfonates; (f) 0.01 to 1% by weight of at least one cor- rosion inhibitor; and (g) a quantity of at least one alkaline compound selected from the group consisting of alkali metal carbonates, bicarbonates or hydroxides and amines, such that the agent has a pH value of 7.5 to 10, the quantity of the components (a) and (b) in the agent being at least 94% by weight, relative to the weight of the agent.

2. Agent as claimed in claim 1, wherein the component (c) is a crosslinked polyacrylate which has a viscosity of 1,000 to 50,000 mPa.s in a 0.5% strength by weight aqueous solution at 20° C. and a pH value of 8 to 9.5, and which has a laminar flow behavior in a 0.1 to 1.5% strength by weight aqueous solution at +20° C., 0° C and −10° C. and a pH value of 8 to 9.5, at a shear rate of up to at least 20,000 seconds$^{-1}$.

3. Agent as claimed in claim 2, wherein the component (a) is a glycol selected from the group consisting of ethylene glycol, propylene glycol and diethylene glycol; the component (c) is a polyacrylate having a viscosity of 5,000 to 30,000 mPa.s, the component (d) is a mixed base mineral oil composed essentially of 60 to 70% by weight of paraffin hydrocarbons having 12 to 18 carbon atoms and of 30 to 40% by weight of naphthenes having 10 to 20 carbon atoms; the component (e) is an alkali metal alkylarylsulfonate selected from the group consisting of potassium alkylarylsulfonates and sodium alkylarylsulfonates having one or two sulfonate groups, one or two alkyl groups of 12 to 18 carbon atoms and one or two benzene rings; the component (f) is a corrosion inhibitor selected from the group consisting of potassium salts and sodium salts of carbonic acid, phosphorous acid, phosphoric acid, and silicic acid, mono-, di- and tri-ethanolamines, mono-, di- and tri-propanolamines and benztriazole; and the component (g) is potassium hydroxide, in a quantity such that the agent has a pH value of 8 to 9.5.

4. Agent as claimed in claim 3, wherein the component (c) is a polyacrylate having a viscosity of 10,000 to 20,000 mPa.s, the component (e) is an alkylbenzenesulfonate selected from the group consisting of potassium alkylbenzenesulfonates and sodium alkylbenzenesulfonates having 12 to 18 C atoms in the alkyl group; and the component (f) is a corrosion inhibitor selected from the group consisting of potassium silicate, sodium silicate, triethanolamine and benztriazole.

5. Agent as claimed in claim 1 or 3, wherein the component (c) is a polyacrylate selected from the group consisting of homopolymers and copolymers of acrylic acid or methacrylic acid.

6. Agent as claimed in claim 1 or 3, wherein the component (c) is a homopolymer of acrylic acid or methacrylic acid.

7. Agent as claimed in claim 1 or 3, wherein the component (c) is a homopolymer of acrylic acid.

8. Agent as claimed in claim 1, wherein the components are present in the following quantities:
(a) 45 to 60% by weight
(b) 40 to 55% by weight
(c) 0.1 to 1% by weight
(d) 0.1 to 0.5% by weight
(e) 0.1 to 0.7% by weight
(f) 0.05 to 0.5% by weight and
(g) 0.1 to 0.5% by weight, the quantity of the components (a) and (b) in the agent being 96 to 99% by weight, relative to the weight of the agent.

9. Agent as claimed in claim 1, which additionally contains: (h) 0.01 to 0.5% by weight of at least one anti-oxidant and, in the case of a crosslinked polyacrylate having a viscosity of about 1,000 to 5,000 mPa.s, (i) 0.01 to 0.5% by weight of a high-molecular xanthan gum as a further thickener.

10. Agent as claimed in claim 9, which contains each of the components (h) and (i) in a quantity of 0.03 to 0.1% by weight.

* * * * *